(12) United States Patent
Matsumoto

(10) Patent No.: US 12,110,122 B2
(45) Date of Patent: Oct. 8, 2024

(54) POWER SUPPLY SYSTEM, FLYING OBJECT, AND METHOD FOR CONTROLLING POWER SUPPLY SYSTEM

(71) Applicant: HONDA MOTOR CO., LTD., Tokyo (JP)

(72) Inventor: Tomoyo Matsumoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 37 days.

(21) Appl. No.: 18/186,560

(22) Filed: Mar. 20, 2023

(65) Prior Publication Data

US 2023/0303260 A1 Sep. 28, 2023

(30) Foreign Application Priority Data

Mar. 23, 2022 (JP) ................................ 2022-046177

(51) Int. Cl.
| | |
|---|---|
| *B64D 31/00* | (2024.01) |
| *B60L 50/60* | (2019.01) |
| *B64C 29/00* | (2006.01) |
| *B64D 27/24* | (2024.01) |
| *H02J 7/00* | (2006.01) |
| *H02P 5/74* | (2006.01) |

(52) U.S. Cl.
CPC ............. *B64D 31/00* (2013.01); *B60L 50/60* (2019.02); *B64C 29/0008* (2013.01); *B64D 27/24* (2013.01); *H02J 7/0014* (2013.01); *H02J 7/0048* (2020.01); *H02J 7/0063* (2013.01); *H02P 5/74* (2013.01); *B60L 2200/10* (2013.01); *B60L 2210/20* (2013.01); *B64D 2221/00* (2013.01)

(58) Field of Classification Search
CPC .... B64D 31/00; B64D 27/24; B64D 2221/00; B60L 50/60; B60L 2200/10; B60L 2210/20; H02J 7/0048; H02J 7/0063; B64C 29/0008; H02P 5/74
See application file for complete search history.

(56) References Cited

U.S. PATENT DOCUMENTS 11,495,982 B2 * 11/2022 Trela .................. H02J 7/0013
2018/0230844 A1    8/2018 Vondrell et al.

FOREIGN PATENT DOCUMENTS

| EP | 3 264 560 A1 | 1/2018 |
|---|---|---|
| EP | 3 875 976 A1 | 9/2021 |
| JP | 2018-509872 A | 4/2018 |
| JP | 2018-132059 A | 8/2018 |
| JP | 2021-170883 A | 10/2021 |
| WO | 2020/090949 A1 | 5/2020 |

* cited by examiner

*Primary Examiner* — Carlos Amaya
(74) *Attorney, Agent, or Firm* — Rankin, Hill & Clark LLP

(57) ABSTRACT

A power supply system includes: a power converter for converting electric power of any one of a plurality of batteries and supplying the converted electric power to one or more second loads; a switch capable of selectively connecting any one of the plurality of batteries to the power converter; and a controller for comparing remaining capacities of the respective batteries, and when the difference between the highest remaining capacity and the lowest remaining capacity exceeds a predetermined threshold, controlling the switch to connect the power converter to the battery having the highest remaining capacity.

7 Claims, 8 Drawing Sheets

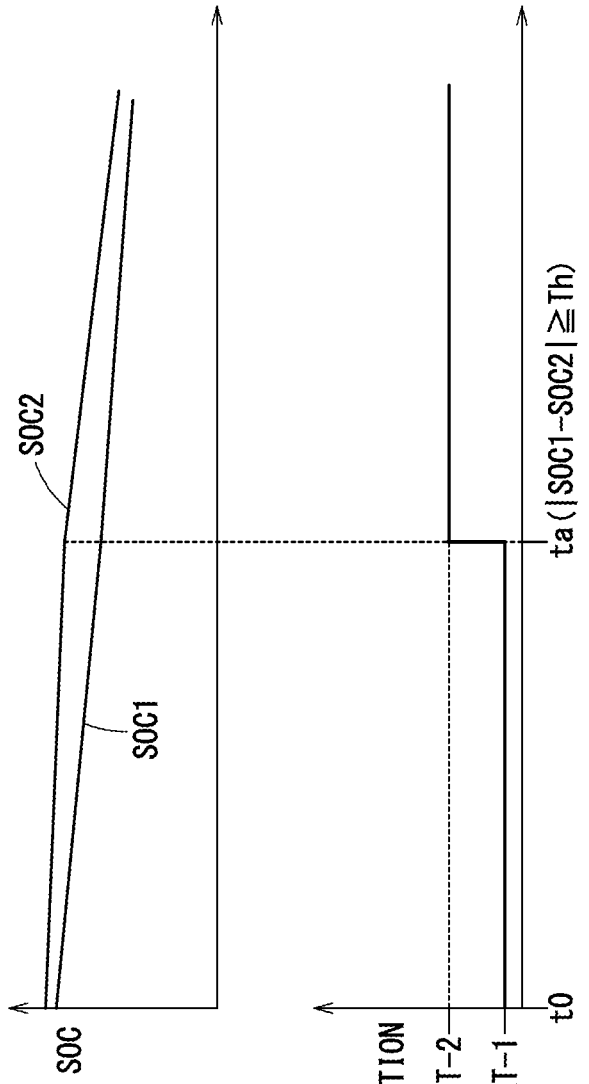

POWER SUPPLY SYSTEM, FLYING OBJECT, AND METHOD FOR CONTROLLING POWER SUPPLY SYSTEM

CROSS-REFERENCE TO RELATED APPLICATIONS

This application is based upon and claims the benefit of priority from Japanese Patent Application No. 2022-046177 filed on Mar. 23, 2022, the contents of which are incorporated herein by reference.

BACKGROUND OF THE INVENTION

Field of the Invention

The present invention relates to a power supply system that supplies electric power from a battery to one or more loads, and a method for controlling the power supply system. The present invention also relates to a flying object including the power supply system.

Description of the Related Art

Currently, power supply systems that supply electric power from a battery (power storage device) to a load (such as a motor) are used in various fields. For example, JP 2018-132059 A discloses a power supply system used in a flying object. The flying object obtains propulsion by rotating a propeller. The propeller is coupled to a rotation shaft of a motor. The motor can be operated by electric power supplied from at least one of a generator or a battery.

SUMMARY OF THE INVENTION

In order to make the power supply system redundant, it is preferable to divide each configuration included in the power supply system into a plurality of groups (electric circuits). In this case, each electric circuit is provided with a battery. Then, there arises a difference in the consumption among the batteries. For example, when a low-voltage device is connected to a first high-voltage circuit via a power converter, the consumption amount of the battery of the first high-voltage circuit becomes larger than that of the battery of a second high-voltage circuit. In order to make the power supply system redundant, it is preferable to equalize the consumption amounts of the respective batteries.

An object of the present invention is to solve the above-mentioned problem.

According to a first aspect of the present invention, there is provided a power supply system comprising: a plurality of electric circuits including a plurality of batteries, respectively, the plurality of electric circuits each including one or more first loads; a power converter configured to convert electric power of any one of the plurality of batteries and supply the converted electric power to one or more second loads; a switch configured to selectively connect any one of the plurality of batteries to the power converter; and a controller configured to compare remaining capacities of the respective batteries, and when a difference between a highest remaining capacity and a lowest remaining capacity exceeds a predetermined threshold, control the switch to connect the power converter to the battery having the highest remaining capacity.

According to a second aspect of the present invention, there is provided a flying object comprising the power supply system of the first aspect.

According to a third aspect of the present invention, there is provided a method for controlling a power supply system, wherein the power supply system includes: a plurality of electric circuits including a plurality of batteries, respectively, the plurality of electric circuits each including one or more first loads; a power converter configured to convert electric power of any one of the plurality of batteries and supply the converted electric power to one or more second loads; a switch configured to selectively connect any one of the plurality of batteries to the power converter; and a controller configured to control the switch, the method causing the controller to execute: comparing remaining capacities of the respective batteries; and when a difference between a highest remaining capacity and a lowest remaining capacity exceeds a predetermined threshold, controlling the switch to connect the power converter to the battery having the highest remaining capacity.

According to the present invention, the remaining capacities of the respective batteries can be made substantially equal.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 6A is a time chart showing the SOC;
FIG. 6B is a time chart showing a connection destination (battery) of a DC-DC converter.

DETAILED DESCRIPTION OF THE INVENTION

1. Configuration of Flying Object 10

Figure 1:
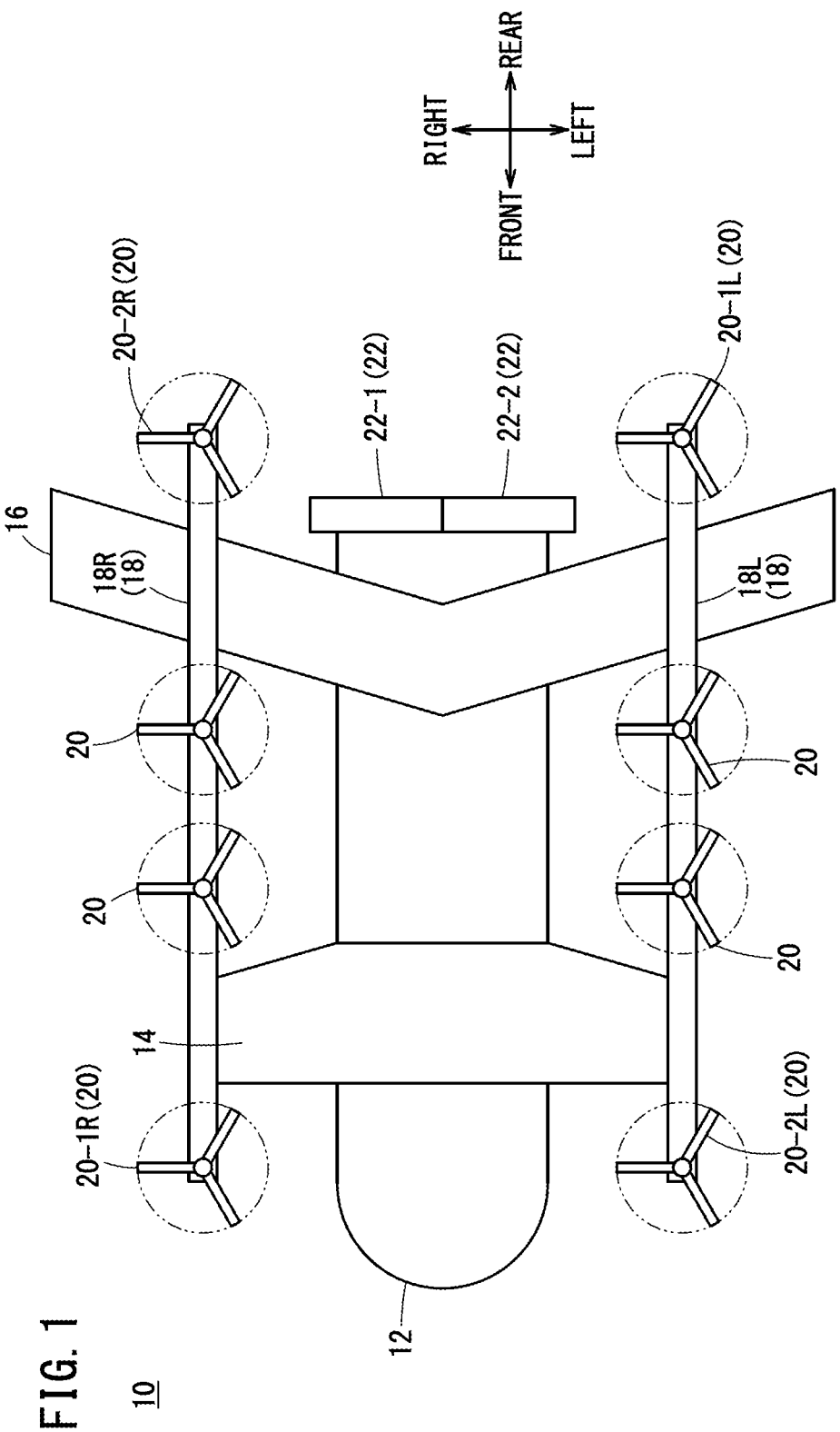
FIG. 1 is a top view of a flying object.
Figure 2:
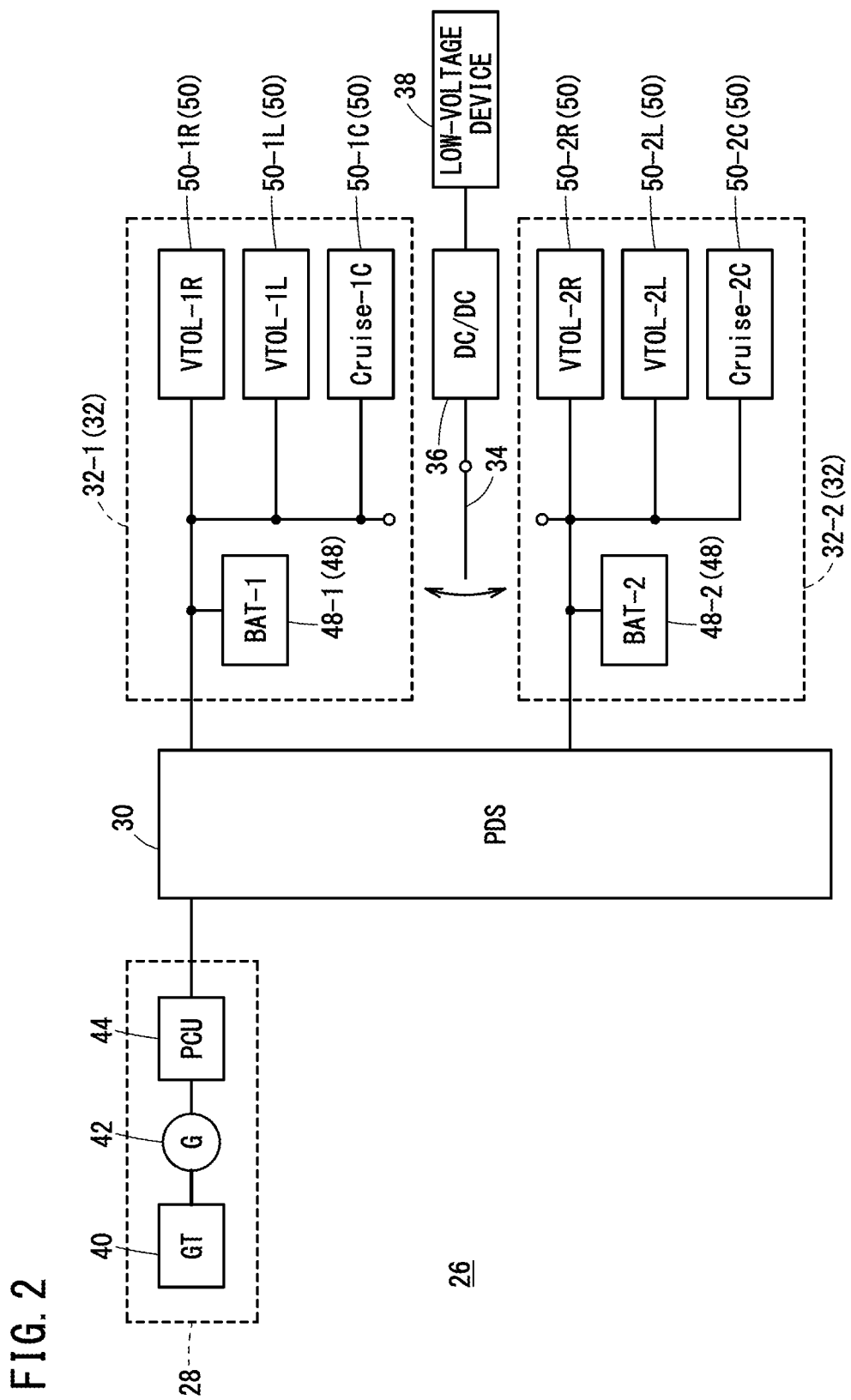
FIG. 2 is a block diagram showing a circuit configuration of a power supply system.

FIG. 1 is a top view of a flying object 10. The flying object 10 is an electric aircraft, for example, an electric vertical take-off and landing aircraft (eVTOL aircraft). Further, the flying object 10 is a hybrid aircraft including a battery 48 and a motor generator 42 (FIG. 2).

The flying object 10 includes a fuselage 12, a front wing 14, a rear wing 16, two booms 18, eight VTOL rotors 20, and two cruise rotors 22.

The front wing 14 is connected to a front portion of the fuselage 12. The rear wing 16 is connected to a rear portion of the fuselage 12. The front wing 14 and the rear wing 16 generate lift when the flying object 10 moves forward.

A boom 18R of the two booms 18 is disposed on the right side of the fuselage 12. A boom 18L of the two booms 18 is disposed on the left side of the fuselage 12. Each boom 18 extends in the front-rear direction.

Four motors 50 (FIG. 2) are disposed on the boom 18R sequentially toward the rear. Similarly, four motors 50 (FIG. 2) are disposed on the boom 18L sequentially toward the rear. The rotation shaft of each motor 50 is coupled to the VTOL rotor 20 corresponding to the motor 50. Each VTOL rotor 20 is used during vertical take-off, during transition from vertical take-off to cruising, during transition from cruising to vertical landing, during vertical landing, and during hovering of the flying object 10. Each VTOL rotor 20 generates lift by rotating.

Two or more motors 50 (FIG. 2) are disposed in the fuselage 12. The rotation shaft of each motor 50 is connected to the cruise rotor 22 corresponding to the motor 50. Each cruise rotor 22 is used during cruising, during transition from vertical take-off to cruising, and during transition from cruising to vertical landing of the flying object 10. Each cruise rotor 22 generates thrust by rotating.

2. Configuration of Power Supply System 26

Figure 3:
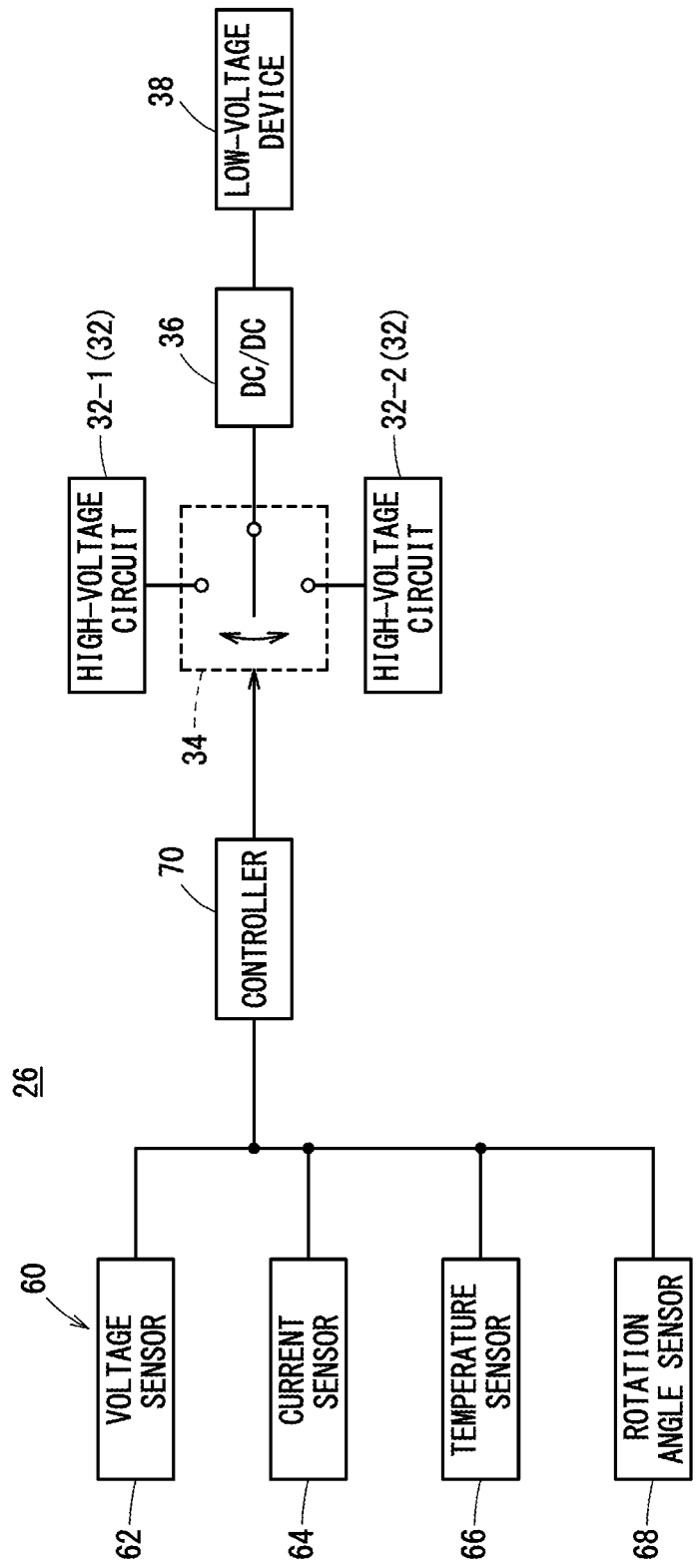
FIG. 3 is a block diagram showing a system configuration of the power supply system.

FIG. 2 is a block diagram showing a circuit configuration of a power supply system 26. FIG. 3 is a block diagram showing a system configuration of the power supply system 26. The flying object 10 includes a plurality of the power supply systems 26. The power supply system 26 shown in FIGS. 2 and 3 is a part of all the power supply systems 26 included in the flying object 10. As shown in FIG. 2, the power supply system 26 includes a power generation system 28, a power distribution system (PDS) 30, a plurality of high-voltage circuits (electric circuits) 32, a switch 34, a DC-DC converter (power converter) 36, and one or more low-voltage devices (second loads) 38. In the present embodiment, the power supply system 26 includes two high-voltage circuits 32 (32-1 and 32-2). Further, as shown in FIG. 3, the power supply system 26 includes a plurality of sensor groups 60 and a controller 70.

The power generation system 28 shown in FIG. 2 includes a gas turbine engine (GT) 40, the motor generator (G) 42, and a power control unit (PCU) 44. An output shaft of the gas turbine engine 40 and a rotation shaft of the motor generator 42 are coupled to each other. When the gas turbine engine 40 rotates, the motor generator 42 generates electric power. The PCU 44 includes an inverter circuit. The primary terminal of the PCU 44 is connected to the terminal of the motor generator 42. The PCU 44 receives, from the primary terminal, the AC power supplied from the motor generator 42, converts the received AC power into DC power, and outputs the converted DC power from a secondary terminal.

The PDS 30 includes a plurality of switch elements. The PDS 30 can electrically connect the PCU 44 and each high-voltage circuit 32 to each other. Further, the PDS 30 can electrically connect the high-voltage circuits 32 to each other. The PDS 30 distributes electric power output by the PCU 44 to each high-voltage circuit 32.

High-voltage electrical devices of the flying object 10 belong to any one of a plurality of independent groups. The power supply system 26 includes two independent groups, namely, two high-voltage circuits 32.

Each of the two high-voltage circuits 32 includes one battery 48 and three motors (first loads) 50. Specifically, the high-voltage circuit 32-1 includes a battery 48-1, a VTOL motor 50-1R, a VTOL motor 50-1L, and a cruise motor 50-1C. The high-voltage circuit 32-2 includes a battery 48-2, a VTOL motor 50-2R, a VTOL motor 50-2L, and a cruise motor 50-2C. In this manner, the high-voltage circuit 32-1 and the high-voltage circuit 32-2 have the same configuration. Therefore, if the respective high-voltage circuits 32 operate in the same manner, basically, an SOC (hereinafter also referred to as "SOC1") of the battery 48-1 and an SOC (hereinafter also referred to as "SOC2") of the battery 48-2 become substantially the same.

The battery 48 is a power storage device having a high voltage of, for example, 800 [V]. The battery 48 is connected to the motor generator 42 via the PDS 30 and the PCU 44. Further, the battery 48 is connected to the three motors 50. The battery 48 can be charged with electric power supplied by the motor generator 42. Further, the battery 48 can also supply electric power to the three motors 50 in the circuit in which the battery 48 is included.

Each motor 50 operates with high-voltage electric power supplied from the motor generator 42 or the battery 48 of the circuit in which the motor 50 is included. The VTOL motor 50-1R rotates a VTOL rotor 20-1R disposed at the foremost position among the four VTOL rotors 20 disposed on the right side (FIG. 1). The VTOL motor 50-1L rotates a VTOL rotor 20-1L disposed at the rearmost position among the four VTOL rotors 20 disposed on the left side (FIG. 1). The cruise motor 50-1C rotates a cruise rotor 22-1 disposed on the right side (FIG. 1). The VTOL motor 50-2R rotates a VTOL rotor 20-2R disposed at the rearmost position among the four VTOL rotors 20 disposed on the right side (FIG. 1). The VTOL motor 50-2L rotates a VTOL rotor 20-2L disposed at the foremost position among the four VTOL rotors 20 disposed on the left side (FIG. 1). The cruise motor 50-2C rotates a cruise rotor 22-2 disposed on the left side (FIG. 1).

As shown in FIG. 1, the VTOL rotor 20-1R and the VTOL rotor 20-1L are arranged to cancel the reaction torque. As shown in FIG. 2, the high-voltage circuit 32-1 includes the VTOL motor 50-1R that rotates the VTOL rotor 20-1R, and the VTOL motor 50-1L that rotates the VTOL rotor 20-1L. Therefore, if the VTOL motor 50-1R is unintentionally stopped, the controller 70 described later stops the VTOL motor 50-1L in the same circuit. On the other hand, when the VTOL motor 50-1L is unintentionally stopped, the controller 70 stops the VTOL motor 50-1R in the same circuit. This stabilizes the balance of the forces in the yaw direction of the flying object 10.

As shown in FIG. 1, the VTOL rotor 20-2R and the VTOL rotor 20-2L are arranged to cancel the reaction torque. As shown in FIG. 2, the high-voltage circuit 32-2 includes the VTOL motor 50-2R that rotates the VTOL rotor 20-2R, and the VTOL motor 50-2L that rotates the VTOL rotor 20-2L. Therefore, if the VTOL motor 50-2R is unintentionally stopped, the controller 70 stops the VTOL motor 50-2L in the same circuit. On the other hand, when the VTOL motor 50-2L is unintentionally stopped, the controller 70 stops the VTOL motor 50-2R in the same circuit. This stabilizes the balance of the forces in the yaw direction of the flying object 10.

The switch 34 can selectively connect any one of the plurality of high-voltage circuits 32 (that is, the batteries 48) to the DC-DC converter 36. The switch 34 performs a switching operation in response to a command signal output from the controller 70.

The DC-DC converter 36 steps down the high-voltage electric power supplied from the motor generator 42 or any one of the batteries 48, and supplies the stepped-down electric power to the low-voltage device 38. For example, the DC-DC converter 36 steps down a voltage of 800 [V] to a voltage of 28 [V].

The low-voltage device 38 is an electrical device that operates at a lower voltage than the electrical device (the motor 50) of the high-voltage circuit 32. Examples of the low-voltage device 38 include avionics equipment. The low-voltage device 38 operates with the electric power stepped down by the DC-DC converter 36.

The sensor group 60 shown in FIG. 3 is provided in each high-voltage circuit 32. The sensor group 60 provided in one high-voltage circuit 32 includes a voltage sensor 62, a current sensor 64, a temperature sensor 66, and a plurality of rotation angle sensors 68. The voltage sensor 62 detects the output voltage of the battery 48. The current sensor 64 detects the output current of the battery 48. The temperature sensor 66 detects the temperature of the battery 48. Each rotation angle sensor 68 detects a displacement of the rotation shaft of the corresponding motor 50. The rotation angle sensor 68 is, for example, a rotary encoder. Each sensor outputs the detection value to the controller 70.

The controller 70 is a computer. The controller 70 may be a flight controller of the flying object 10. The controller 70 includes processing circuitry and a memory. The processing circuitry may be a processor such as a CPU. The processing circuitry may be an integrated circuit such as an ASIC or an FPGA. The processor can execute various processes by executing programs stored in the memory. For example, by the processing circuitry executing a program, the controller 70 performs switching control of the switch 34 in order to equalize the SOCs of the batteries 48. At least some of the plurality of processes may be executed by an electronic circuit including a discrete device.

The memory includes a volatile memory and a non-volatile memory. Examples of the volatile memory include a RAM and the like. The volatile memory is used as a working memory of the processor. The volatile memory temporarily stores data and the like necessary for processing or computation. Examples of the non-volatile memory include a ROM, a flash memory, and the like. The non-volatile memory is used as a storage memory. The non-volatile memory stores programs, tables, maps, and the like. At least a part of the memory may be included in the processor, the integrated circuit, or the like as described above. The non-volatile memory stores a threshold Th of the SOC used in the following SOC equalization process. The threshold Th may be arbitrarily set. For example, the threshold Th may be calculated based on an error rate of each sensor.

3. SOC Equalization Process

Figure 4:
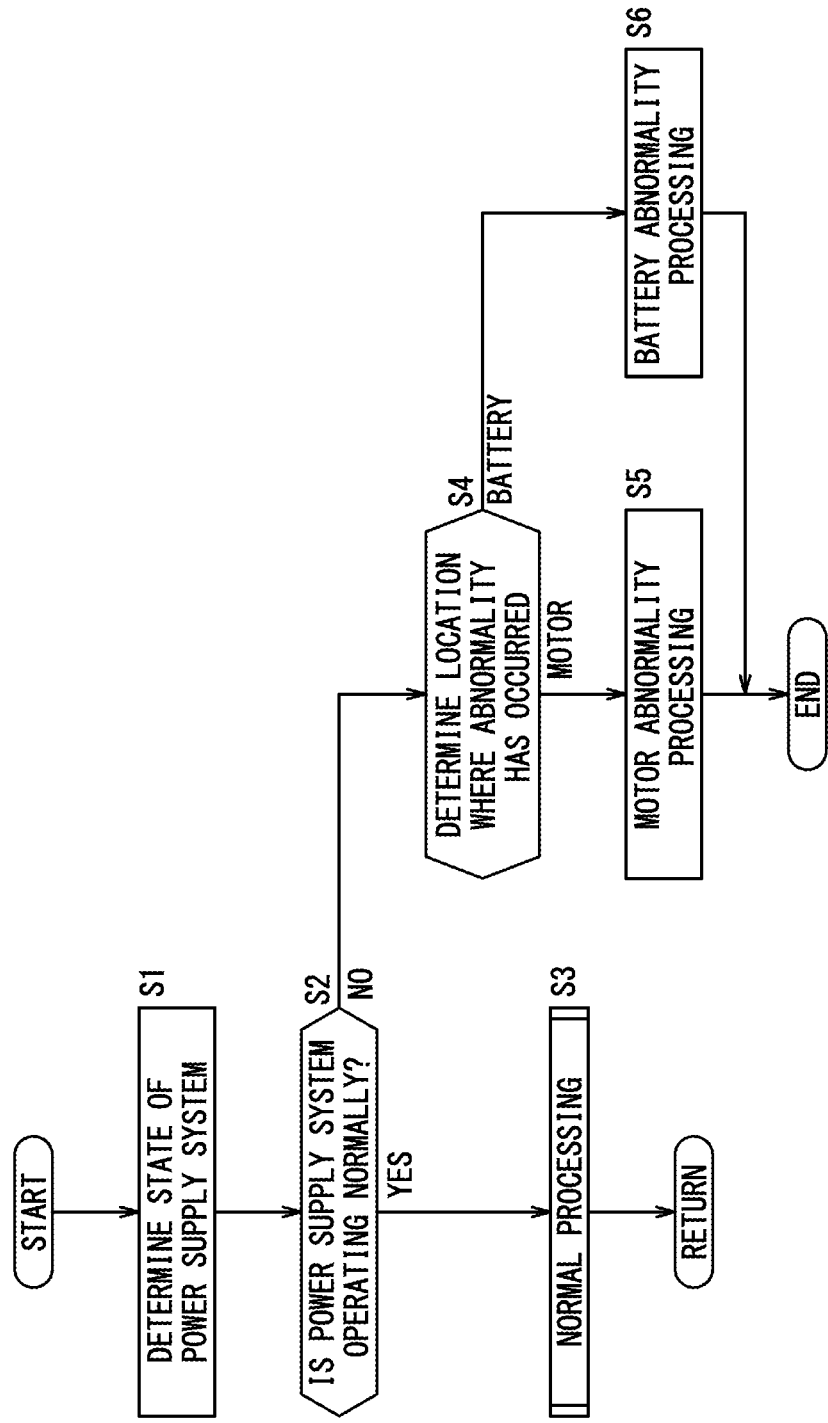
FIG. 4 is a flowchart showing a procedure of an SOC equalization process.

FIG. 4 is a flowchart showing a procedure of an SOC equalization process. The controller 70 performs the SOC equalization process at predetermined time intervals while the power of the flying object 10 is turned on. However, when an abnormality occurs in the power supply system 26 (step S2: NO), the controller 70 performs predetermined processes (step S4 to step S6) and then ends the SOC equalization process.

In step S1, the controller 70 determines the state of the power supply system 26. For example, the controller 70 determines whether or not each motor 50 is operating normally by using the detection value of each rotation angle sensor 68. When the motor 50 to be operated is not rotating, that is, when the motor 50 is stopped, the controller 70 determines that an abnormality has occurred in the motor 50. In addition, the controller 70 determines whether or not each battery 48 is operating normally by using the detection value of each voltage sensor 62 and the detection value of each current sensor 64. When the detection value of the voltage sensor 62 or the detection value of the current sensor 64 are out of a predetermined normal range, the controller 70 determines that an abnormality has occurred in the battery 48. The normal range is stored in the memory. After the execution of step S1, the process proceeds to step S2.

In step S2, the controller 70 determines whether or not the power supply system 26 is operating normally based on the determination result in step S1. If the power supply system 26 is operating normally (step S2: YES), the process proceeds to step S3. On the other hand, if an abnormality has occurred in the power supply system 26 (step S2: NO), the process proceeds to step S4.

When the process proceeds from step S2 to step S3, the controller 70 executes normal processing described in [4] below. When the normal processing is executed, the process in this cycle ends.

When the process proceeds from step S2 to step S4, the controller 70 determines a location where the abnormality has occurred. If the abnormality has occurred in the motor 50 (step S4: motor), the process proceeds to step S5. On the other hand, if the abnormality has occurred in the battery 48 (step S4: battery), the process proceeds to step S6.

When the process proceeds from step S4 to step S5, the controller 70 executes motor abnormality processing described in [5] below. When the motor abnormality processing is executed, the SOC equalization process ends.

When the process proceeds from step S4 to step S6, the controller 70 executes battery abnormality processing described in [6] below. When the battery abnormality processing is executed, the SOC equalization process ends.

4. Normal Processing

Figure 5:
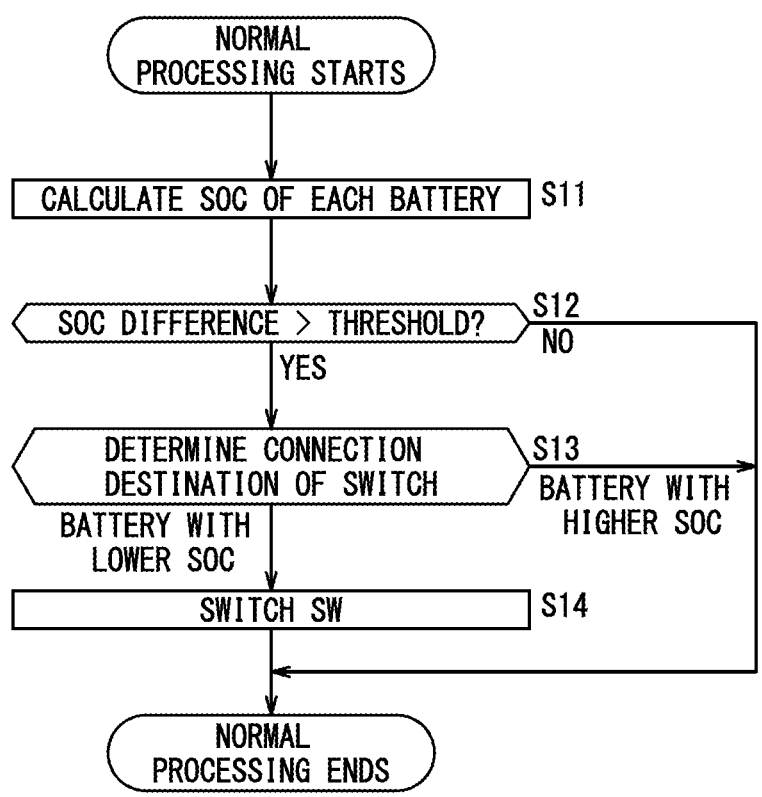
FIG. 5 is a flowchart showing a procedure of normal processing.

The normal processing performed in step S3 of FIG. 4 will be described with reference to FIG. 5. FIG. 5 is a flowchart showing a procedure of the normal processing. In step S3 of FIG. 4, the controller 70 executes the normal processing according to the procedure shown in FIG. 5.

In step S11, the controller 70 calculates the remaining capacity of each battery 48. Here, the controller 70 calculates the SOC of each battery 48 using the detection value of each voltage sensor 62, the detection value of each current sensor 64, and the detection value of each temperature sensor 66. After the execution of step S11, the process proceeds to step S12.

In step S12, the controller 70 compares the respective SOCs calculated in step S11. When the difference between the SOCs is greater than the predetermined threshold Th (step S12: YES), the process proceeds to step S13. On the other hand, when the difference between the SOCs is equal to or less than the predetermined threshold Th (step S12: NO), the normal processing ends. In this case, the controller 70 does not perform switching of the switch 34.

When the process proceeds from step S12 to step S13, the controller 70 determines to which of the high-voltage circuits 32 the switch 34 (that is, the DC-DC converter 36) is currently connected. When the switch 34 is connected to the high-voltage circuit 32 including the battery 48 with a lower SOC (step S13; battery with a lower SOC), the process proceeds to step S14. On the other hand, when the switch 34 is connected to the high-voltage circuit 32 including the battery 48 with a higher SOC (step S13; battery with a higher SOC), the normal processing ends. In this case, the controller 70 does not perform switching of the switch 34. When the configurations of the high-voltage circuits 32 are the same, the SOC of the battery 48 included in the high-voltage circuit 32 to which the DC-DC converter 36 is connected is usually lower.

When the process proceeds from step S13 to step S14, the controller 70 switches the switch 34. That is, the controller 70 switches the battery 48 that supplies electric power to each low-voltage device 38. After the execution of step S14, the normal processing ends.

The normal processing will be described with the lapse of time with reference to FIGS. 6A and 6B. FIG. 6A is a time chart showing the SOC. FIG. 6B is a time chart showing the connection destination (battery 48) of the DC-DC converter 36.

At time point t0, the switch 34 is connected to the high-voltage circuit 32-1. That is, the DC-DC converter 36 and the low-voltage device 38 are connected to the battery 48-1 (BAT-1). At this time, the battery 48-1 supplies electric power to the low-voltage device 38. Therefore, the decreasing rate of the SOC1 is higher than the decreasing rate of the SOC2.

During a period from the time point t0 to time point ta, the difference between the SOC1 and the SOC2 (|SOC1-SOC2|) is equal to or less than the threshold Th. At the time point ta, the difference between the SOC1 and the SOC2 becomes greater than the threshold Th. As described above, the switch 34 is connected to the battery 48-1 having a lower SOC. The controller 70 switches the switch 34 to equalize the SOCs. Then, the DC-DC converter 36 and the low-voltage device 38 are connected to the battery 48-2 (BAT-2). In FIGS. 6A and 6B, the timing at which the difference between the SOC1 and the SOC2 becomes greater than the threshold Th and the timing at which the controller 70 switches the switch 34 are indicated by the same time point ta. However, in actuality, there is a slight time lag between the timing at which the difference between the SOC1 and the SOC2 becomes greater than the threshold Th and the timing at which the controller 70 switches the switch 34.

After the controller 70 switches the switch 34, the battery 48-2 supplies electric power to the low-voltage device 38. Therefore, the decreasing rate of the SOC2 is higher than the decreasing rate of the SOC1. As a result, the difference between the SOC1 and the SOC2 gradually decreases.

When the SOC1 exceeds the SOC2 and the difference between the SOC1 and the SOC2 becomes greater than the threshold Th, the controller 70 switches the switch 34 again.

As described above, each time the difference between the SOC1 and the SOC2 exceeds the threshold Th, the controller 70 controls the switch 34 to connect the DC-DC converter 36 to the battery 48 having a higher SOC. Therefore, the difference between the SOC1 and the SOC2 becomes equal to or less than the threshold. Therefore, the SOCs of the batteries become substantially equal.

5. Motor Abnormality Processing

Figures 7A, 7B:
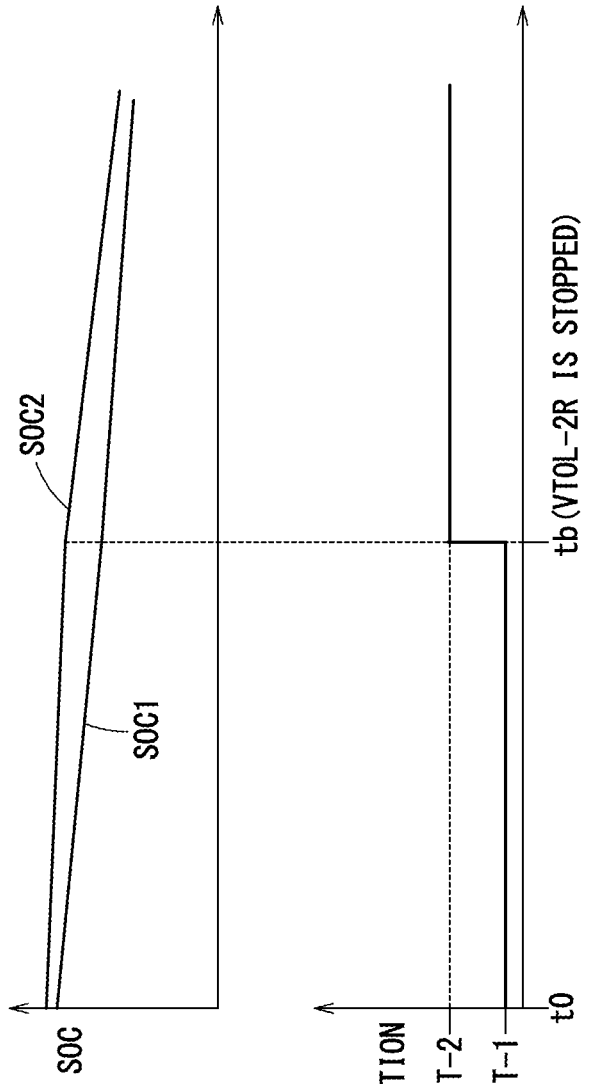
FIG. 7A is a time chart showing the SOC.
FIG. 7B is a time chart showing the connection destination (battery) of the DC-DC converter.

The motor abnormality processing performed in step S5 of FIG. 4 will be described with the lapse of time with reference to FIGS. 7A and 7B. FIG. 7A is a time chart showing the SOC. FIG. 7B is a time chart showing the connection destination (battery 48) of the DC-DC converter 36.

At time point t0, the switch 34 is connected to the high-voltage circuit 32-1. That is, the DC-DC converter 36 and the low-voltage device 38 are connected to the battery 48-1. At this time, the battery 48-1 supplies electric power to the low-voltage device 38.

It is assumed that a component of the high-voltage circuit 32-2, for example, the VTOL motor 50-2R is unintentionally stopped at time point tb. In this case, the controller 70 stops the VTOL motor 50-2L that is paired with the VTOL motor 50-2R in the high-voltage circuit 32-2. Thus, the controller 70 balances the forces in the yaw direction of the flying object 10. As a result, the two VTOL motors 50-2R and 50-2L of the high-voltage circuit 32-2 do not consume electric power. Accordingly, the decreasing rate of the SOC2 is greatly reduced. Therefore, the controller 70 selects the battery 48-2 as the connection destination of the DC-DC converter 36. The controller 70 connects the switch 34 to the high-voltage circuit 32-2.

As described above, in the motor abnormality processing, the controller 70 connects the switch 34 to the high-voltage circuit 32 (here, the high-voltage circuit 32-2) including the stopped electrical devices (here, the VTOL motors 50-2R and 50-2L). In other words, when an electrical device is stopped, if the switch 34 is connected to an electric circuit other than the high-voltage circuit 32 including the stopped electrical device, the controller 70 switches the switch 34. On the other hand, when an electrical device is stopped, if the switch 34 is connected to the high-voltage circuit 32 including the stopped electrical device, the controller 70 maintains the connection state of the switch 34. By the above-described processing, the speed at which the difference between the SOC1 and the SOC2 increases is reduced. After the motor abnormality processing, the state of the switch 34 is maintained regardless of the SOC of each battery 48.

6. Battery Abnormality Processing

Figures 8A, 8B:
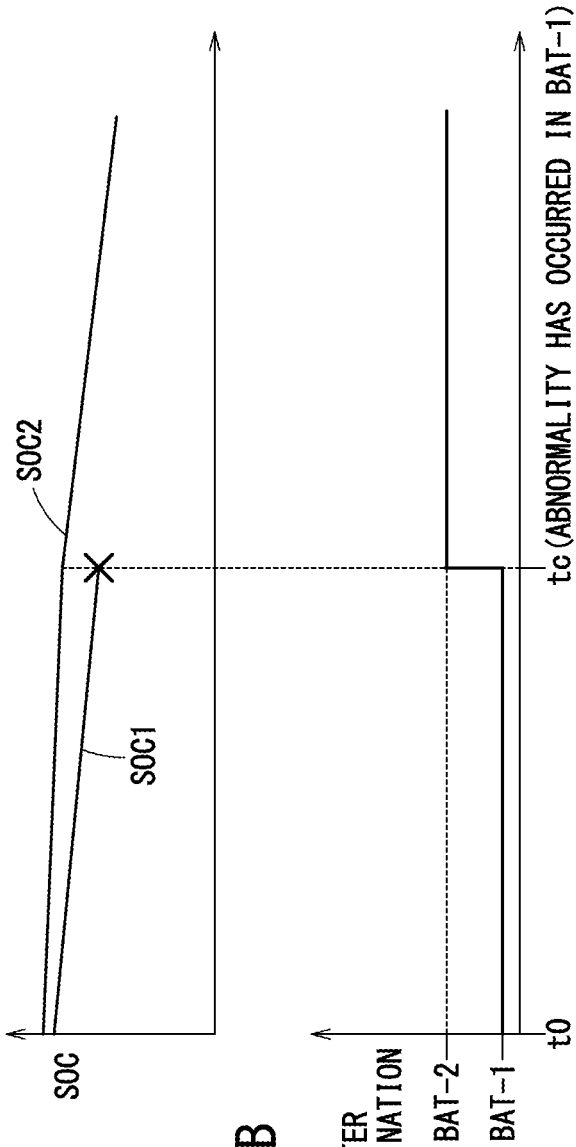
FIG. 8A is a time chart showing the SOC.
FIG. 8B is a time chart showing the connection destination (battery) of the DC-DC converter.

The battery abnormality processing performed in step S6 of FIG. 4 will be described with the lapse of time with reference to FIGS. 8A and 8B. FIG. 8A is a time chart showing the SOC. FIG. 8B is a time chart showing the connection destination (battery 48) of the DC-DC converter 36.

At time point t0, the switch 34 is connected to the high-voltage circuit 32-1. That is, the DC-DC converter 36 and the low-voltage device 38 are connected to the battery 48-1. At this time, the battery 48-1 supplies electric power to the low-voltage device 38.

It is assumed that an abnormality has occurred in the battery 48-1 of the high-voltage circuit 32-1 at time point tc. In this case, the controller 70 selects the battery 48-2 as the connection destination of the DC-DC converter 36. The controller 70 connects the switch 34 to the high-voltage circuit 32-2.

As described above, in the battery abnormality processing, the controller 70 connects the switch 34 to the high-voltage circuit 32 including the battery 48 (here, the battery 48-2) that is operating normally. In other words, when an abnormality has occurred in the battery 48, if the switch 34 is connected to an electric circuit other than the high-voltage circuit 32 including the battery 48, the controller 70 maintains the connection state of the switch 34. On the other hand, when an abnormality has occurred in the battery 48, if the switch 34 is connected to the high-voltage circuit 32 including the battery 48, the controller 70 switches the switch 34. By the processing described above, interruption of power supply to the low-voltage device 38 is avoided. After the battery abnormality processing, the state of the switch 34 is maintained regardless of the SOC of each battery 48.

7. Modification

In the above embodiment, the power supply system 26 includes one power generation system 28 and two high-voltage circuits 32. Instead, the power supply system 26 may include one or more power generation systems 28 and three or more high-voltage circuits 32. When the switch 34 selectively switches the connection between the three or more high-voltage circuits 32 and the DC-DC converter 36, the controller 70 may compare the difference between the highest SOC and the lowest SOC with the threshold Th.

In the embodiment described above, the power supply system 26 is provided in the flying object 10. Instead, the power supply system 26 may be provided in a place other than the flying object 10 (for example, a ship, a vehicle, or the like). Further, the configurations of the high-voltage circuits 32 may be different from each other. In addition, the DC-DC converter 36 may boost the low-voltage electric power.

In the above-described embodiment, the controller 70 performs the motor abnormality processing when the motor 50 is unintentionally stopped. In addition, the controller 70 may perform the same processing as the motor abnormality processing also when the operator (pilot) intentionally stops the motor 50.

8. Invention Obtained from Embodiments

The invention that can be grasped from the above embodiments will be described below.

A first aspect of the invention is the power supply system (26) including: the plurality of electric circuits (32) each including the battery (48), and one or more first loads (50). The power supply system includes: the power converter (36) configured to convert electric power of any one of the plurality of batteries and supply the converted electric power to one or more second loads (38); the switch (34) configured to selectively connect any one of the plurality of batteries to the power converter; and the controller (70) configured to compare remaining capacities of the respective batteries, and when the difference between the highest remaining capacity and the lowest remaining capacity exceeds the predetermined threshold (Th), control the switch to connect the power converter to the battery having the highest remaining capacity.

In the above configuration, each time the difference between the remaining capacities of the plurality of batteries exceeds the threshold, the controller controls the switch to connect the power converter to the battery having the higher remaining capacity. Therefore, the difference between the remaining capacities of the plurality of batteries becomes equal to or less than the threshold. Therefore, according to the above configuration, the remaining capacities of the respective batteries can be made substantially equal.

In the above aspect, the plurality of electric circuits may have the same configuration.

In the above aspect, when any one of the first loads is stopped, the controller may control the switch to connect the power converter to the battery of the electric circuit that includes the stopped first load, regardless of the remaining capacities of the batteries.

In the above aspect, when an abnormality has occurred in any one of the batteries, the controller may control the switch to connect the power converter to another battery in which no abnormality has occurred among the batteries.

A second aspect of the present invention is the flying object (10) including the power supply system of the first aspect.

In the above aspect, each of the electric circuits may include, as the first loads, the vertical take-off and landing motor (50-1R, 50-1L, 50-2R, 50-2L) used during vertical take-off and landing, and the cruise motor (50-1C, 50-2C) used during cruising.

A third aspect of the present invention is the method for controlling the power supply system, wherein the power supply system includes: the plurality of electric circuits each including the battery, and one or more first loads; the power converter configured to convert electric power of any one of the plurality of batteries and supply the converted electric power to one or more second loads; the switch configured to selectively connect any one of the plurality of batteries to the power converter; and the controller configured to control the switch, the method causing the controller to execute: the step (S12) of comparing remaining capacities of the respective batteries; and the step (S14) of, when the difference between the highest remaining capacity and the lowest remaining capacity exceeds the predetermined threshold, controlling the switch to connect the power converter to the battery having the highest remaining capacity.

The present invention is not limited to the above disclosure, and various modifications are possible without departing from the essence and gist of the present invention.

The invention claimed is:

1. A power supply system comprising:
   a plurality of electric circuits including a plurality of batteries, respectively, the plurality of electric circuits each including one or more first loads;
   a power converter configured to convert electric power of any one of the plurality of batteries and supply the converted electric power to one or more second loads;
   a switch configured to selectively connect any one of the plurality of batteries to the power converter; and
   a controller configured to compare remaining capacities of the respective batteries, and when a difference between a highest remaining capacity and a lowest remaining capacity exceeds a predetermined threshold, control the switch to connect the power converter to the battery having the highest remaining capacity.

2. The power supply system according to claim 1, wherein the plurality of electric circuits have a same configuration.

3. The power supply system according to claim 1, wherein when any one of the first loads is stopped, the controller controls the switch to connect the power converter to the battery of the electric circuit that includes the stopped first load, regardless of the remaining capacities of the batteries.

4. The power supply system according to claim 1, wherein when an abnormality has occurred in any one of the batteries, the controller controls the switch to connect the power converter to another battery in which no abnormality has occurred among the batteries.

5. A flying object comprising a power supply system, wherein the power supply system includes:
   a plurality of electric circuits including a plurality of batteries, respectively, the plurality of electric circuits each including one or more first loads;
   a power converter configured to convert electric power of any one of the plurality of batteries and supply the converted electric power to one or more second loads;
   a switch configured to selectively connect any one of the plurality of batteries to the power converter; and
   a controller configured to compare remaining capacities of the respective batteries, and when a difference between a highest remaining capacity and a lowest remaining capacity exceeds a predetermined threshold, control the switch to connect the power converter to the battery having the highest remaining capacity.

6. The flying object according to claim 5, wherein
each of the electric circuits includes, as the first loads, a vertical take-off and landing motor used during vertical take-off and landing, and a cruise motor used during cruising.

7. A method for controlling a power supply system,
wherein the power supply system includes:
a plurality of electric circuits including a plurality of batteries, respectively, the plurality of electric circuits each including one or more first loads;
a power converter configured to convert electric power of any one of the plurality of batteries and supply the converted electric power to one or more second loads;
a switch configured to selectively connect any one of the plurality of batteries to the power converter; and
a controller configured to control the switch,
the method causing the controller to execute:
comparing remaining capacities of the respective batteries; and
when a difference between a highest remaining capacity and a lowest remaining capacity exceeds a predetermined threshold, controlling the switch to connect the power converter to the battery having the highest remaining capacity.

* * * * *